US008990685B1

(12) United States Patent
Sandoval et al.

(10) Patent No.: US 8,990,685 B1
(45) Date of Patent: Mar. 24, 2015

(54) SYSTEMS AND METHODS FOR CREATING AND DISPLAYING WEB DOCUMENTS

(75) Inventors: Christopher Andrew Sandoval, San Antonio, TX (US); Lee William Fastenau, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1863 days.

(21) Appl. No.: 11/395,389

(22) Filed: Mar. 31, 2006

(51) Int. Cl.
*G06F 17/00* (2006.01)
*G06F 17/30* (2006.01)

(52) U.S. Cl.
CPC .... *G06F 17/30902* (2013.01); *G06F 17/30899* (2013.01)
USPC ......................................... 715/271; 715/208

(58) Field of Classification Search
CPC ................... G06F 17/30902; G06F 17/30899; G06F 17/2247; G06F 17/2235; H04L 67/02
USPC ................. 715/203, 864, 242, 234, 271, 208; 709/203
See application file for complete search history.

(56) References Cited

U.S. PATENT DOCUMENTS

| 5,737,619 | A  | * | 4/1998  | Judson ........................... 715/236 |
| 6,182,133 | B1 | * | 1/2001  | Horvitz .......................... 709/223 |
| 6,807,570 | B1 | * | 10/2004 | Allen et al. .................... 709/219 |
| 6,857,102 | B1 |   | 2/2005  | Bickmore et al. |
| 6,983,331 | B1 |   | 1/2006  | Mitchell et al. |
| 7,216,297 | B1 |   | 5/2007  | Douglis et al. |
| 7,512,658 | B2 |   | 3/2009  | Brown et al. |
| 7,565,605 | B2 |   | 7/2009  | Schohn et al. |
| 7,565,612 | B2 |   | 7/2009  | Schelvis et al. |
| 2004/0216036 | A1 | * | 10/2004 | Chu et al. .................... 715/501.1 |
| 2004/0248561 | A1 |   | 12/2004 | Nykanen et al. |
| 2005/0022109 | A1 |   | 1/2005  | Sakai et al. |
| 2005/0165941 | A1 | * | 7/2005  | Eytchison et al. ............ 709/231 |
| 2006/0143568 | A1 |   | 6/2006  | Milener et al. |

OTHER PUBLICATIONS

Kangasharju et al., Performance evaluation of redirection schemes in content distribution networks, Computer Communications, vol. 24, Issue 2, Feb. 1, 2001, pp. 207-214.*
"How to Preload an Image", © Wavelength Media, Archived by archive.org on Jun. 30, 2004 http://www.mediacollege.com/internet/javascript/image/preload.html.*
"Delaying animated gif display until fully downloaded . . . " news:comp.multimedia, Last posting Dec. 15, 1996, Retrieved from Google Groups http://groups.google.com/group/comp.multimedia/browse_thread/thread/1f81d69270957e8c/e3df7d02fbc281df?hl=en#e3df7d02fbc281df.*
Hentzen, W. et al., "How a Web Page Works," *WebRAD: Building Database Applications on the Web with Visual FoxPro and Web Connection*, Sep. 2002, 9, 171-200.
Larkin, Thomas, "An Evaluation of Caching Strategies for Clustered Web Servers," *University of Dublin*, 2001, 53 pages.

(Continued)

*Primary Examiner* — Adam M Queler
(74) *Attorney, Agent, or Firm* — Joseph A. Fuche; Nixon Peabody LLP

(57) ABSTRACT

A system and a method for loading and displaying content from a plurality of content sources on a user computer is disclosed. The content is placed on a web document having a first web page and at least one other web page. The contents in the first web page are loaded and displayed on the user computer and the contents of the other web pages are loaded in cache and displayed on the first web page after the contents have been fully loaded.

12 Claims, 8 Drawing Sheets

(56) References Cited

OTHER PUBLICATIONS

Markatos, Evangelos, "A Cash-based Approach to Caching Web Documents," *Institute of Computer Science & Foundation for Research and Technology*, 1998, Technical Report 230, 14 pages.

Provost, Guy, "How Caching Works," http://computer.howstuffworks.com/cache/htm, downloaded Nov. 2001, 5 pages.

Tyson, Jeff, "How Internet Infrastructure Works," http://computer.howstuffworks.com/internet-infrastructure.htm, downloaded Nov. 2001, 7 pages.

Yanev, Kliment, "Cache replacement algorithms in web caches—caching of various media types," University of Helsinki, 2005, 22 pages.

\* cited by examiner

SYSTEMS AND METHODS FOR CREATING AND DISPLAYING WEB DOCUMENTS

CROSS REFERENCE TO RELATED APPLICATIONS

This application is related by subject matter to the following commonly assigned applications, the entirety of which are hereby incorporated by reference herein: U.S. patent application Ser. No. 11/395,388, filed on same date herewith and entitled "SYSTEMS AND METHODS FOR CREATING AND DISPLAYING WEB DOCUMENTS"; and U.S. patent application Ser. No. 11/396,083, filed on same date herewith and entitled "SYSTEMS AND METHODS FOR CREATING AND DISPLAYING WEB DOCUMENTS."

TECHNICAL FIELD

The systems and methods relate generally to web browsing, and more particularly to systems and methods for creating web documents that can be efficiently displayed by a web browser, and systems and methods for efficiently displaying web documents.

BACKGROUND

The internet has become a ubiquitous source of information for consumers. The information (content) that can be accessed through the internet includes text, pictures, animation, video and sound recording, and may include software. Users typically access content through the internet by using web browsers. The web browser is a computer program that accesses a web server on the Internet and requests the content. The content is usually transmitted as a web document, which is a text file that contains text, and a set of HTML tags that provide instructions to the browser about how to display the content associated with the web document on the user's screen. The web browser interprets the HTML tags within the web document in order to display the page on the user's screen and determine where to access additional contents from the server. For example, the tags may instruct the browser to display text, change the font size or color of the text, or arrange the content in rows or columns, or access an image file stored at a designated location accessible to the server.

As all users of the internet know, there is a delay between the time the user accesses the web site and the time when the page is fully displayed on the screen. This delay may increase depending on the web site resources and the complexity of the web page. Many complex web pages include content generated by multiple content sources and servers, each optimized for a different kind of web object: databases, streaming media, banner ads, CGI scripts. Those content sources and servers may operate at different speeds or under conditions that may impact the performance of the web browser in interpreting the web document, loading the content or displaying the content. If the generation of content from any content source or server is delayed (or fails altogether), the user of the client browser would perceive either a slow-loading page or an empty spot where the content failed to load. Speed of loading a web page is a critical component of a satisfactory user experience. It is often said that a good web site is a fast web site.

The types of computers and connection speeds of user systems vary widely. For example, a user system that incorporates a 56 k modem (56,000 bits per second) may download data at a rate of approximately 4,000-7,000 bytes per second, while a user system connected though an ISDN may download data at a rate of 64,000 to 128,000 bits per second. At the upper range may be a T1 line that provides an effective bandwidth of 1.5 million bits per second. User systems that are locally connected through Ethernet may communicate at up to 400,000 bytes per second. These varying access bandwidths translate into varying wait time for rendering of web pages. For example, a web page that is primarily text, having a size of approximately 1,000 bytes would render in less than 1 second even with a 56K modem. However, a typical image file or a small sound file having 100,000 bytes may take 20 seconds to download with a 56K modem. A typical video or large sound file having 1,000,000 bytes may take over 3 minutes to download using a 56K modem. The rule of thumb used by web designers is that a web page should download in 10 seconds or less, over a 56K modem. This has been translated roughly to a page size of 70K.

One way that the performance of content generation can be improved is web caching. Web caching is the temporary storage of web objects (such as HTML documents) for later retrieval. The Internet connection of a user's computer is typically its slowest link. Web browsers (e.g. Internet Explorer, Netscape, etc.) use the hard disk of the user's computer to store HTML pages, putting them into a special folder on the hard disk. The first time a user asks for an HTML page, the server transmits a web document to the web browser. The web browser renders the document (i.e. the web browser executes the instructions in the web document, including displaying content in the document, requesting access to remote content on the server, loading the remote content and displaying the remote content). The web browser may also store a copy of the web document and associated content (including remote content) in the user's hard disk. The next time the user requests access to that document, the web browser checks if the date of the file associated with the document on the server is newer than the date of the file containing a copy of the web document and associated content cached in the hard disk. If the date is the same, the web browser uses the web document on the user's hard disk instead of accessing the document on the server. This action reduces the time to render the content on the user's interface (monitor). There are three significant advantages to web caching: reduced bandwidth consumption (fewer requests and responses that need to go over the network), reduced server load (fewer requests for a server to handle), and reduced latency (since responses for cached requests are available immediately). Together, they make the web less expensive and better performing.

The existing uses of caching are used to store a copy of an entire web page after the entire web page has been downloaded. The existing methods of caching provide an advantage only when the web document is accessed for the second time. Such use of caching does not solve the problem of a negative user experience when downloading slow loading content for the first time or loading content from a plurality of sources if some of the sources are slow or non responding.

SUMMARY

The disadvantages of the methods for displaying web pages in the prior art are overcome by the novel method of organizing the content from each content source as a web document comprising first web page, at least one other web page and instructions to a browser on the user's computer to display the first page on the screen, load the other pages in cache and display the other pages on the screen with the first page after being fully loaded in cache.

In one embodiment a system for displaying content from a plurality of content sources is disclosed, that includes a subsystem that converts the content from the content sources into a web document having a first portion including the content from a subset of content sources; at least one other portion including the content from the remainder of the content sources, and instructions to display the first portion, load at least one other portion in cache, and instructions to display at least one other portion after it has been fully loaded in cache.

The embodiments disclosed in this application provide the functionality that a web document is created by a server indicating where content is may be found on gathered by a server and sent to a client browser where it is loaded/cached into an invisible container. Once the content has been completely loaded into the invisible container it is 'dealt out' into it's visible display page(s). If the content generation is slow (or fails altogether), the user of the client browser will not notice because the failure occurs in the invisible page and the loading into the visible page never occurs.

Another aspect of the functionality provided by the embodiments disclosed in this application is that the method can be used for invisibly pre-loading multi-media, images, documents and any other content. The method can be used for loading internet advertising, video, audio and other content rich-media in a way that the user is not made aware of any delays in loading.

BRIEF DESCRIPTION OF THE DRAWINGS

Other features of the systems and methods disclosed are further apparent from the following detailed description taken in conjunction with the accompanying drawings, in which.

DETAILED DESCRIPTION

Figure 1:
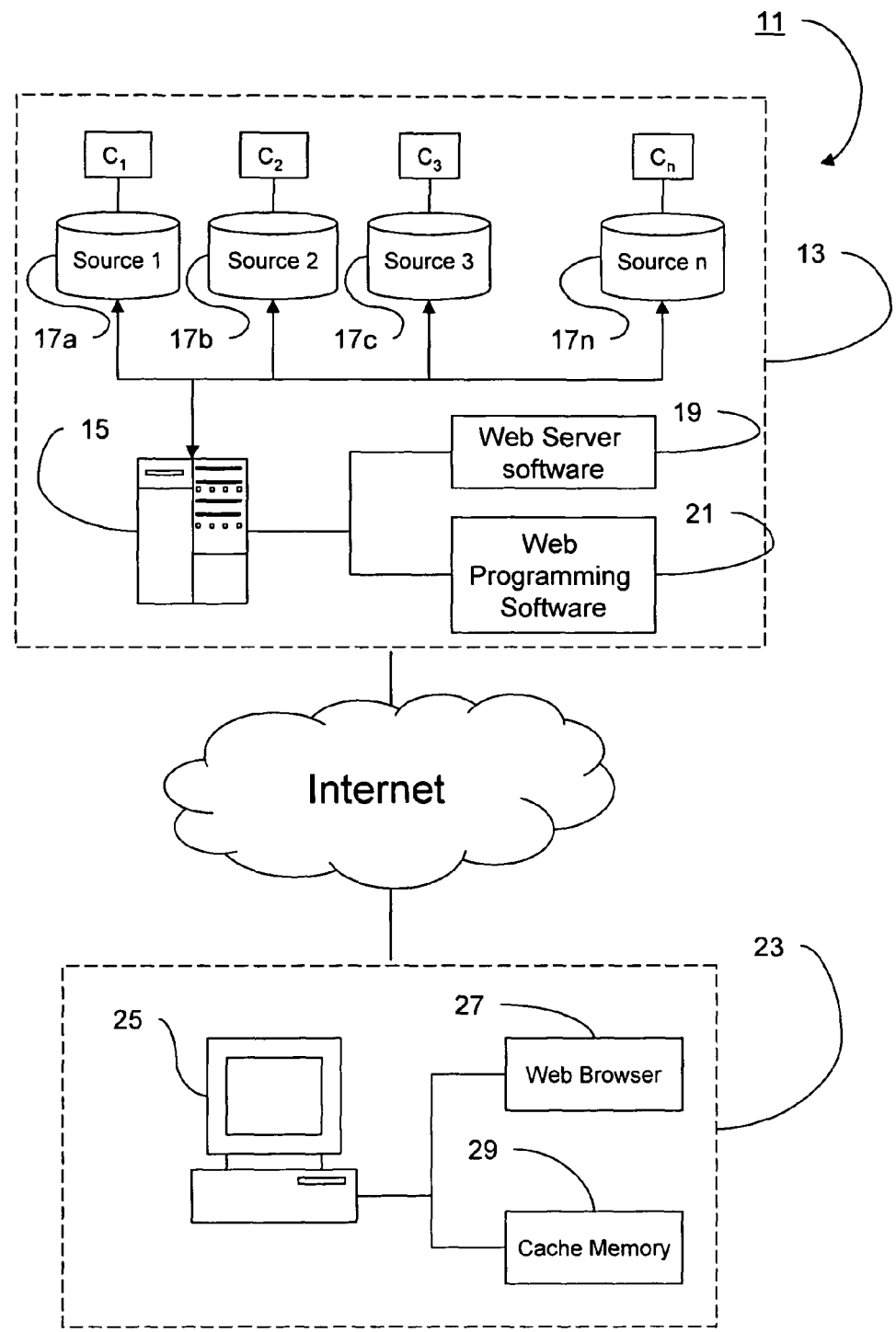
FIG. 1 is a schematic of a network in which the methods and systems for improving web browsing is implemented.

FIG. 1 illustrates a network 11 in which various aspects of the systems and methods for improving web browsing are implemented. The network includes a Server System 13 that includes at least one server 15 and a plurality of content sources 17 $a$-$17n$ for storing content ($C_1$-$C_n$) which may include text, pictures, animation, video and sound recording, and software. Server 15 runs Web Server Software 19 that accepts HTTP requests from users. Examples of Web Server Software 19 include Apache HTTP Server, Internet Information Services, Sun Java System Web Server, and Zeus Web Server. There are a large number of other Web Server Software that are commercially available. The Web Server Software 19 accepts HTTP requests from the network, and provides an HTTP response to the requester. The HTTP response is typically an HTML document, but may be another type of document. The HTML document is a special text file having text that comprises the content of the page, and instructions about how the information should be displayed, as well as information that instructs the user computer where to find any special items that are contained on the page, such as graphics. The documents may be static, if maintained in a file, or may be dynamic if it is generated by a program that integrates content from different sources. Thus with dynamic documents, the content sources 17 are accessed by the a program on server 15 and the Web Programming Software 21 generates the document. Examples of Web Programming Software 21 include Cold fusion, Lasso, Miva and PHP. The Web programming software may include a template engine that processes input text (the template) to produce one or more output texts. Examples of template engines include Smarty or vlibTemplate and can be used to separate scripting language from HTML. The processing itself generally consists in replacing specific sequences of text with data provided by a model or resulting from more complex operations. A template created by a template engine often contains HTML and variables. When the template engine (using a scripting language) is processing the template, all variables are replaced with assigned content. The content often is stored in a database. Some template engines include methods to fetch this content and use it with the template.

The network 11 also may include a plurality of Client Systems 23, which would typically be operated by an individual user. Client System 23 includes a user computer 25, such as a PC, having a web browser software 27 and cache memory 29. The web browser software 27 is a program that is used to locate and display Web pages. Commercially available web browsers include Netscape Navigator and Microsoft Internet Explorer. These browsers can display graphics as well as text and may present multimedia content such as sound and video. When a user selects a web site or link using a web browser the web browser software 27 sends a request to the Server 15. The request instructs the server to return the information that will enable the user computer 25 to display the page. This information is stored on the Server 15. The server transmits the information as an HTML document to the user computer 25. The Web Browser Software 27 interprets the information in the HTML Document and displays the page on the screen of the user computer 25. If the HTML document includes instructions, the Web Browser Software 27 will execute those instructions (e.g. request graphics to be subsequently returned and displayed).

Figure 2:
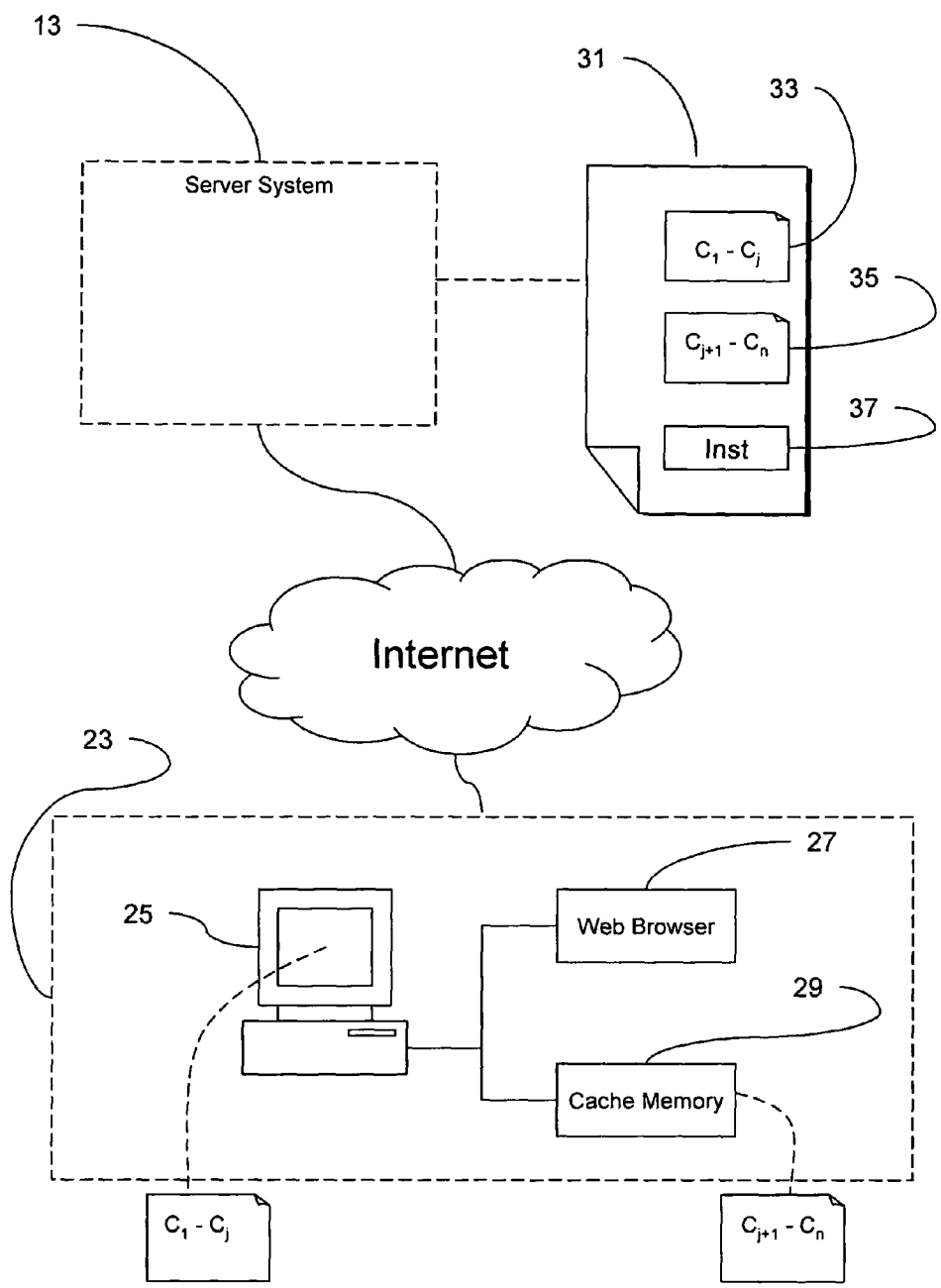
FIG. 2 is a schematic illustrating a document created by the server side systems and methods for improving web browsing and the systems and methods of displaying and caching the contents of the documents on the user system.

FIG. 2 illustrates the operation of the Server System 13 and the Client System 23 in caching and displaying web content in accordance with one embodiment of this disclosure. Typically, a user operating the Client System 23 will connect to the internet and access a Web Site serviced by the Server system 13. As stated previously, the Web Browser 27 in the Client System 23 will send a request to the Server 15 in the Server System 13. The Server System 13 generates a Web Document 31, in, for example, HTML or similar format. The Web Document 31 includes a first set of text and instructions 33 that are to be interpreted and executed by the Web Browser 27 in the Client System 23. The first set of text and instructions 33 includes content from a first subset of content sources $C_1$-$C_j$ and instructions associated with how content $C_1$-$C_j$ should be displayed by the Client System 23. The Web Document 31 also includes a second set of text and instructions 35 that includes content from a second subset of content sources $C_j+1$-$C_n$ and instructions associated with how content $C_j+1$-$C_n$ should be displayed by the Client System 23. Although in this example only two subsets of content are discussed it is contemplated that multiple subsets could be employed. The Web Document 31 may be stored as a static document to be accessed by a user or may be dynamically created upon the user accessing the Web Site. The Web Document 31 also includes a set of instruction 37 that instructs the Web Browser 27 to display the first set of text and instructions 33 immediately on the output screen of the User Computer 25 and to load the second set of text and instructions in the Client System cache memory 29.

As stated above, a typical web page may include text, images and other content. When a Server System 13 returns a Web Document 31 to a Client System 23, the Web Browser 27 executes instructions on the Web Document 31 to display the content. Text content is typically included in the Web Document 33. Images and other large content is usually maintained in a file in the Server System 13, and the Web Document 31 would include a command indicating where the image can be found and where the image should be placed when displayed.

For example, a typical web page may include a text portion (11K), a logo for the home page (20K); navigation images (22K); four images in GIF format (88K), external JavaScript (5K) and a small sound file (100K). The total size of the document is 246 k. Using a 56 k modem, this file would take approximately 35 seconds to render. Text loads very fast while images, audio and audiovisual files tend to load more slowly. In the example above, the first set of text and instructions 33 may be directed to the text portion, the logo for the home page, the navigation images, and the external JavaScript, for a total size of content of 58K. This would take approximately 8 seconds to render. The second set of text and instructions in the Web document may be directed to the access of the images, and sound files (188 k). Those files can be loaded into cache 28 while the user is viewing the first rendered page. The images and sound files would take approximately 26 seconds to download into cache and less than a second to render on the user's screen. Ideally, the time for rendering the first page should not exceed 15 seconds using a 56K modem, with the optimum maximum rendering time being 10 seconds. This would require controlling the size of the first subset of content items 33 to between 70 to 105 KB.

Loading of content such as images and sound directly to cache prior to rendering can be accomplished through a number of techniques. For example, an image can be loaded into cache by including the image in a web page that would be rendered by the browser prior to the page where the image would be used. One way that this can be accomplished is by loading the image in a first web page, at the bottom of the page with a width and height of 1 pixel. The HTML instruction for accomplishing this effect is:

<IMG SRC="imgname.gif" border="0" width="1" height="1">

That instruction would load the image in a way that it is not visible to the user, and the image would be stored in cache for displayed when instructed.

Another way to preload content such as images is to use a scripting language such as JavaScript to load the images and save them in cache. JavaScripts in a page are typically executed immediately while the page loads into the browser, unless instructions to the contrary are inserted in the script. So, for example to load a script before anyone uses it would require the script to be place in the head section of the HTML document A typical script would read as follows:
<script type="text/javascript">
<!—hide from non JavaScript Browsers
ImageA=new Image(50,50)
ImageA.src="Apic.gif"
ImageB=new Image(50,50)
ImageB.src="Bpic.gif"
ImageC=new Image(50,50)
ImageC.src="Cpic.gif"
ImageD=new Image(50,50)
ImageD.src="Dpic.gif"
//End Hiding—>
</script>

Yet another way to preload content such as an image into cache is to use a scripting language such as JavaScript to create a cache loading function. An example of a publicly available script is set out below.

<script type="text/javascript">
<!—hide from non JavaScript Browsers
var cachecontent=new Array( )
function cacheload("http://domain.com/source1/Apic.gif",
http://domain.com/source1/Bpic.gif", http://domain.com/source2/Cpic.gif",
http://domain.com//source2/Dpic.gif")
{
for (i=0;i<cacheload.length;i++)
{
cachecontent[i]=new Image( )
cachecontent[i].src=cacheload.arguments[i]
}
}
//End Hiding—>
</script>

In the examples above images are preloaded into cache before they are displayed by a users web browser.

Figure 3:
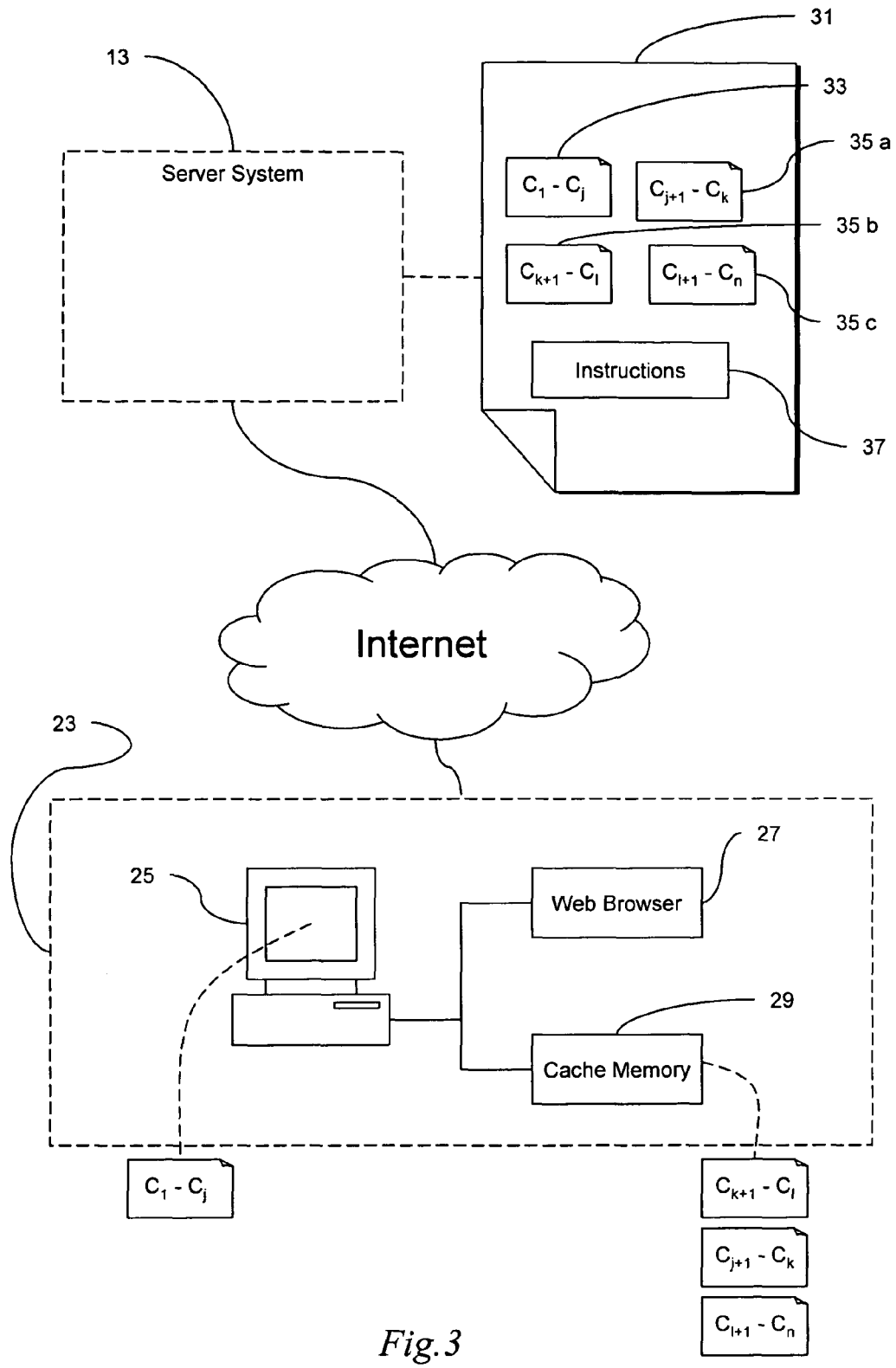
FIG. 3 is a schematic illustrating an alternate embodiment of a document created by the server system.

Although in the example above, the set of content was divided into two subsets, it should be apparent to one skilled in the art that a plurality of subsets may be created. Illustrated in FIG. 3 is a system where the set of content C1 through Cn is subdivided into a finite number of subsets $C_1$-$C_j$; $C_j+1$-$C_k$; $C_k+1$-$C_l$; and $C_l+1$-$C_n$. In this example, the server system 13 generates a web document 31 and records a set of instructions to be executed by the web browser 27. Associated with a first subset of content $C_1$-$C_j$ would be instructions to load and immediately display the content. Associated with content $C_j+1$-$C_k$; $C_k+1$-$C_l$; and $C_l+1$-$C_n$ would be a set of instructions to cache the content (i.e. load the content into the cache memory of the user computer). Also included in the web document 31 would be instructions to the web browser to display each content subset once the content subset has been fully loaded. In this example, Content $C_1$-$C_n$ may include a text portion (11K), a logo for the home page (20K); navigation images (22K); five photographs in JPG format (122K), external JavaScript (5K) and a small sound file (100K) and a video file (1,000K). The total size of the document is 1,280K. If the user tried to render that document all at once using a 56 k modem, it may take over 3 minutes to download and render. Using the approach illustrated in FIG. 3, content C1-Cj may include the text portion, the logo the navigation images and the external JavaScript as in the previous example (file size 58 k). This would take approximately 8 seconds to render. Content Cj+1-Ck may include two of the photographs in JPG format (25 k). These would take approximately 4 seconds to down load. Content $C_k+1$-$C_l$ may include the remaining photographs and the sound file (173K) that would take approximately 25 seconds to download. Finally, Content $C_l+1$-$C_n$ may include the video (1,000K) that may take approximately 2.5 minutes to download.

Figure 4:
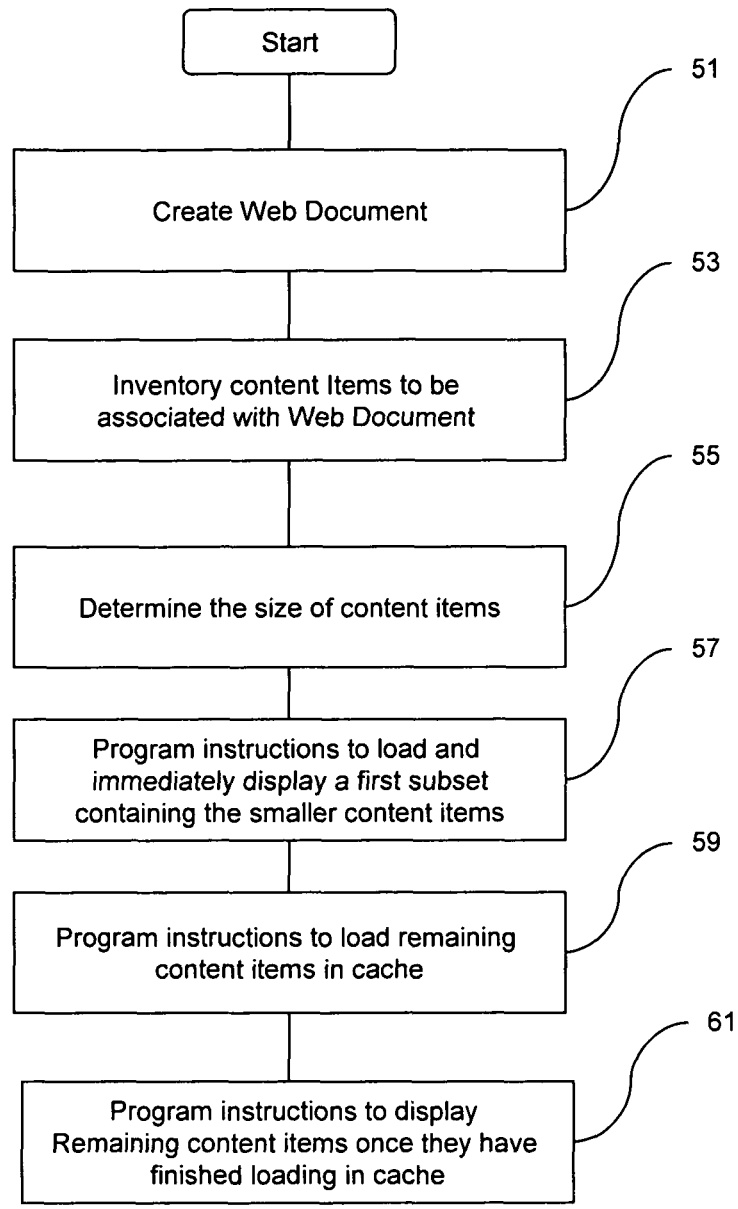
FIG. 4 is a flow chart illustrating the method of creating a web document.

Illustrated in FIG. 4 is a method for generating a Web Document 31 that has a plurality of content items. This method may be implemented by the Web Programming Software 21 in the Server System 13. The method includes the operation 51 of creating a web document. The web document may be a document written in a mark-up language such as HTML or XHTML web pages that are the predominant formats on the interne. However, the method may be used with other mark-up languages such as XML or SGML. The method also includes an operation 53 that determines the content to be associated with the Web Document, including the location of the content. The method also includes an operation 55 is to determine the size of the file containing the content item. Although in this example, file size is the metric used other parameters may be used to determine which files should be loaded and immediately displayed and which files should be loaded in cache. (for example by determining the type of file from the file name extension e.g. .jpg, .war, etc.). Usually, the slower loading files would be loaded in cache so the user receives an immediate display of the fast loading files. The method includes an operation 57, that programs instructions to the browser to load and immediately display a first subset of the content items. Also included is an operation 59 to program instructions to load the remaining content items in cache. Yet another operation $6^1$ of the method is to program instructions to display the remaining content items once they have been loaded into cache. The method may be performed by a programmer (e.g. to a static web page where the contents of the web page does not change often) or may be performed by a Template Engine (e.g. in the case of a dynamic web page where the content is constantly changing or is compiled from many sources).

Figure 5:
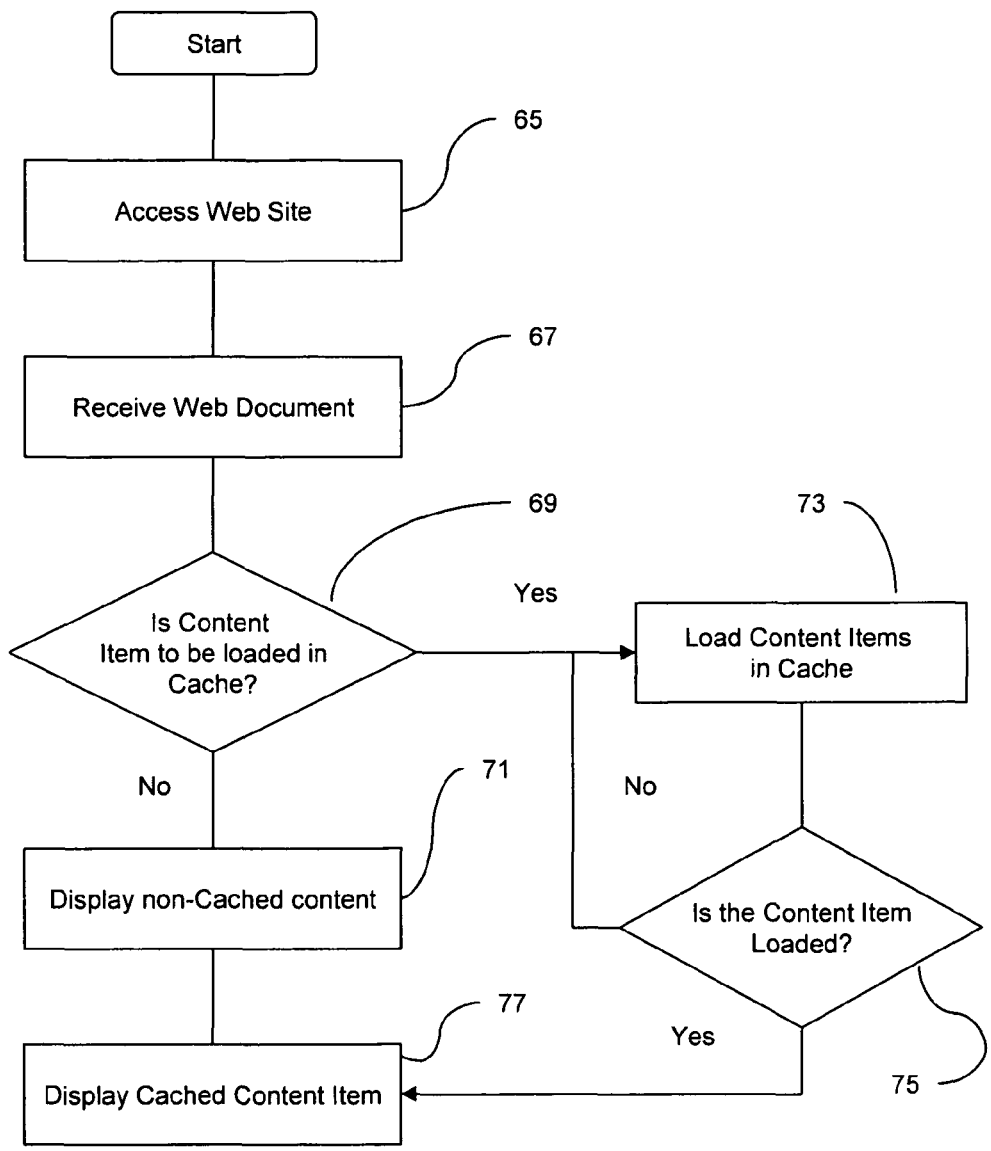
FIG. 5 is a flowchart illustrating the method of displaying the content.

FIG. 5 is a schematic of the method implemented by the User System 23. The method includes an operation 65 where the User System 23 accesses a web site. In operation 67 a web document including a plurality of content items and instructions that operate on the content items is received. The method includes an operation 69 to determine if the content item is to be loaded in cache. If the content item is not to be loaded in cache the method implemented by the user performs operation 71 to that immediately loads and displays the content items that are not cached. If the content item is to be cached, operation 69 instructs the User System to begin loading the content item in cache. Operation 75 determines whether the content item is fully loaded and when it is, operation 77 instructs the User System to display the fully rendered cached item. If after a certain period one of the other pages has not loaded in cache the attempted load will time out, but the user will be oblivious to that occurrence.

In another embodiment, the first web page may include hyperlinks to at least one other web page other web page that includes large content files, and the hyperlinked web page will not be displayed until the hyperlink is activated. The Server System 13 may create a Web Document 31 that includes the content of the first page and at least a portion of the content in the hyperlinked pages. The portion of the content of the hyperlinked pages would be loaded into cache as the first page is being loaded and displayed. Thus, for example, if a hyperlinked page has a video that may be displayed if the user accesses the hyperlinked page, the video may begin loading even before the user accesses the hyperlinked page. That way when the user accesses the page and selects the video for playback, the video file is accessed from the cache rather than being downloaded from the Server System 13.

Figure 6:
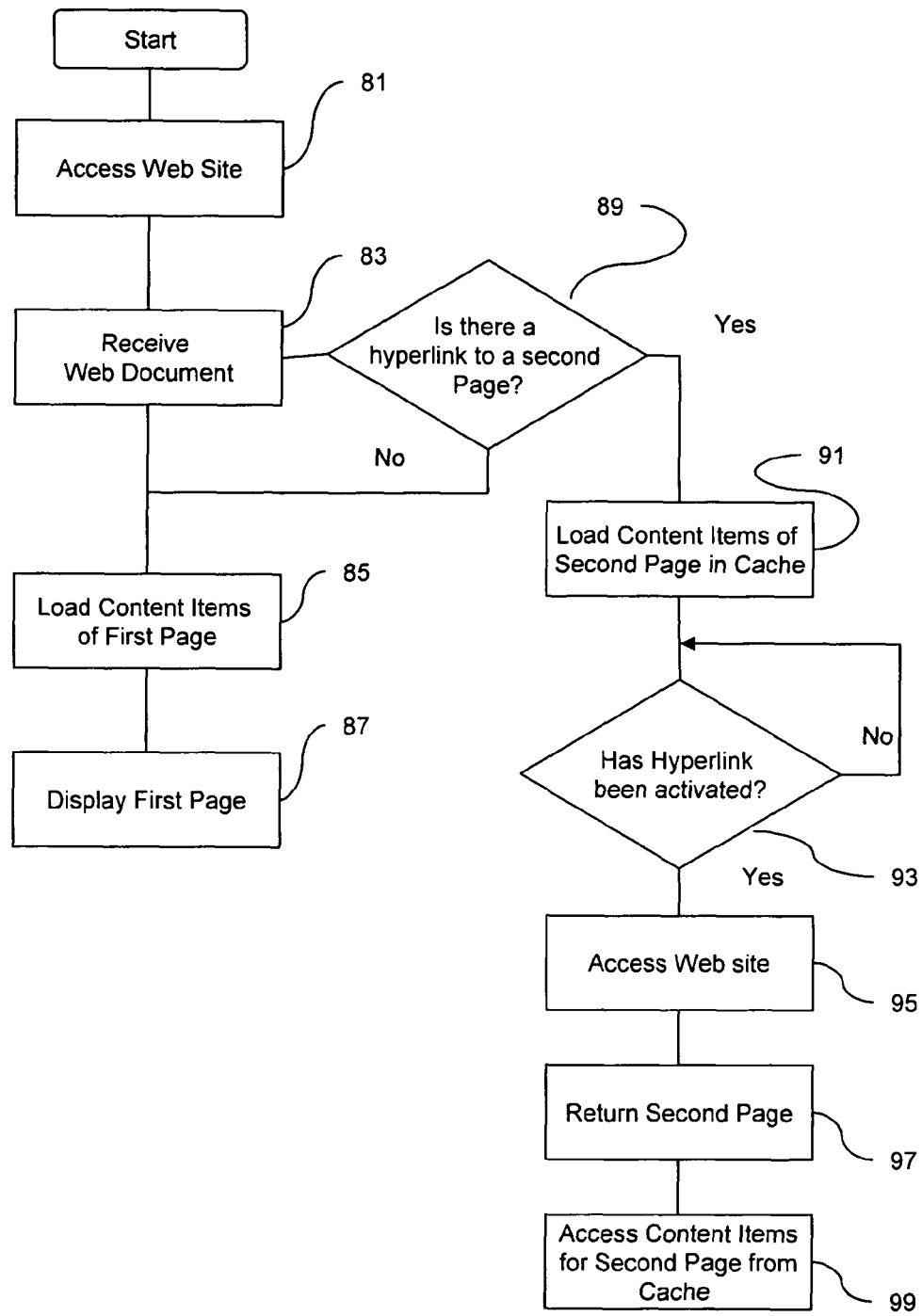
FIG. 6 is a flow chart that illustrates another method of displaying content.

The method implemented by the User System 23 is illustrated in FIG. 6. The User System accesses a web site in operation 81. In operation 83 the user system receives a Web document that may be displayed in the normal fashion, or in accordance with the methods described above. This would involve operation 85, loading the content items of the first page and displaying the first page. The method also includes operation 89 to determine if the web document received in operation 83 includes hyperlinks to other pages. If it does the user system loads the Content Items in the second page into cache while the first page is being loaded and displayed. If the hyperlink is activated in operation 93, the User System accesses the web site in operation 95, returns and the second page in operation 97. The User System then accesses the content Items for the second page from cache in operation 99. In this way, the web page associated with the hyperlink may be downloaded in cache and displayed when the user activates the hyperlink and the content that would have to be downloaded from a second site may be cached for rapid access by the user.

Figure 7:
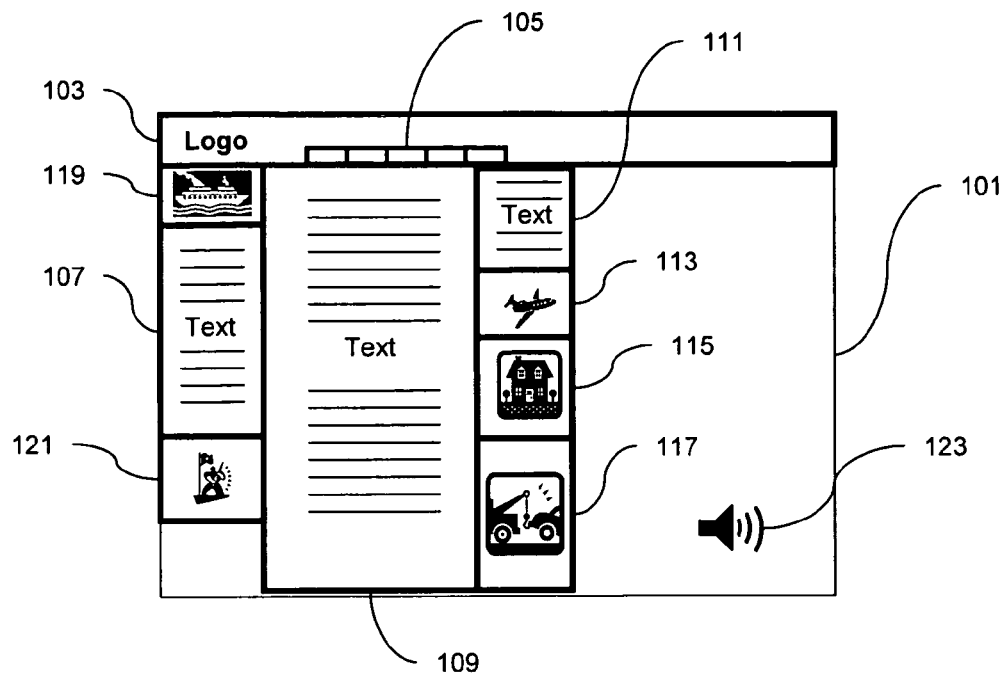
FIGS. 7 through 9 are illustrations of a sequential rendering of content on a user's display.
Figure 8:
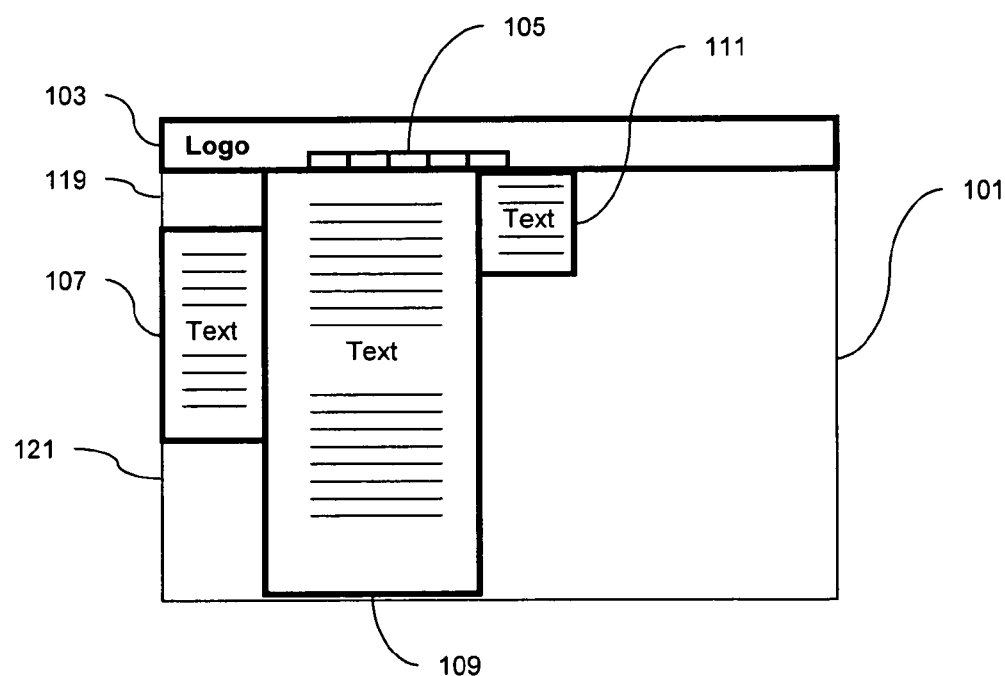
Figure 9:
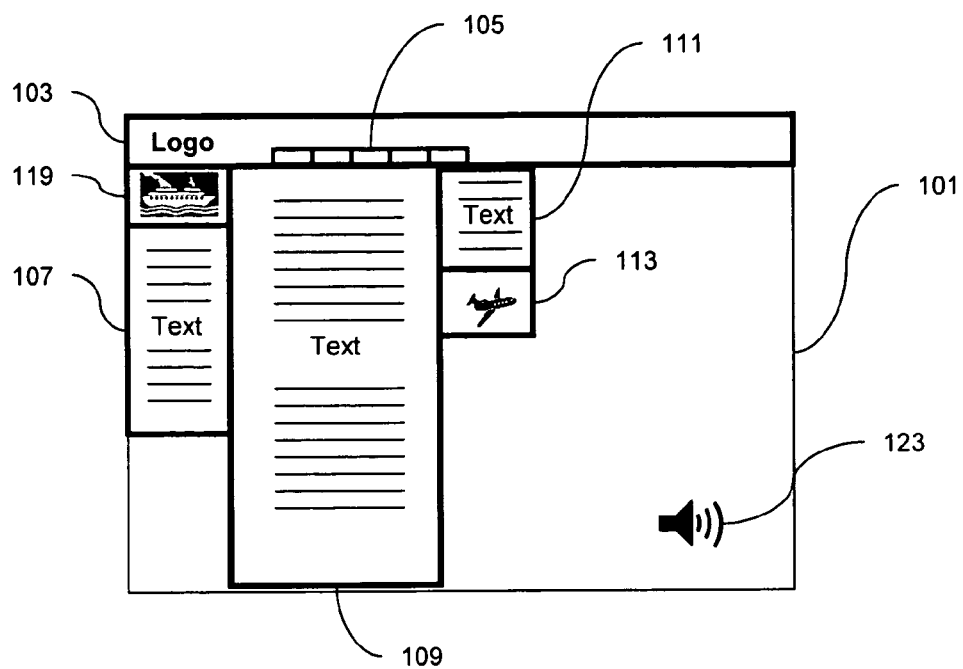

Illustrated in FIGS. 7 through 10 is a sequential rendering of a content display in accordance with an embodiment of this disclosure. FIG. 7 illustrates all of the content components of an example of a fully rendered web page 101. These components include a web site logo 103, navigation images 105, text content item 107, text content item 109 and text content item 111. Also included in the fully rendered web page 101 are graphic content items 113, 115, 117 119 and 121. Additionally the web page may play an audio file illustrated as content item 123. In accordance with the method described above, the user accesses a web page on the Server System 13, and the Server System returns a Web Document to the User System. The Web Browser 27 in the User System 23 will display the web site logo. The navigation images and the text content items immediately, as illustrated in FIG. 8. The remaining content items would be loaded into cache. The remaining content items may be separated into two subsets of content items. The first subset of content items may include graphics content 119, graphics content 113 and audio content 123. As soon as the first subset of content items is fully loaded in cache the browser is instructed to display the content over the content already being displayed. The second subset would the be displayed after it has fully loaded in cache.

While the systems and methods have been particularly shown and described with reference to the embodiments thereof, it will be understood by those skilled in the art that the systems and methods have not limited to the embodiments specifically disclosed herein. Those skilled in the art will appreciate that various changes and adaptations of the system and methods may be made in the form and details of these embodiments without departing from the true spirit and scope of the systems and methods as defined by the following claims.

What is claimed is:

1. A method for displaying a plurality of content items in a user computer comprising:
accessing a web site;
receiving a web document having a content item having a first plurality of files and a hyperlink to a second file;
determining for each of the first plurality of files whether it is a fast loading file or a slow loading file based on the size of the file or the type of file from the file name extension;
loading and immediately displaying the fast loading files;
loading the slow loading files into a cache and only displaying the slow loading files when they have been fully loaded into the cache; and
loading the second file into the cache and displaying the second file upon activation of the hyperlink by the user.

2. The method of claim 1 wherein the fast loading files includes text content, a website logo and navigation images.

3. The method of claim 2 wherein the slow loading files include files containing graphics content and audio content.

4. The method of claim 1 wherein said method element of loading and immediately displaying the fast loading files comprises loading and displaying a total file size not to exceed 105 KB.

5. A non-transitory computer readable medium comprising computer executable instructions for displaying a first plurality of files and a second file accessible through a hyperlink, said computer readable medium comprising instructions to:
- determine for each of the first plurality of files whether it is a fast loading file or a slow loading file based on the size of the file or the type of file from the file name extension;
- load and immediately display the fast loading files;
- load the slow loading files into a cache and only displaying the slow loading files when they have been fully loaded into the cache;
- load the second file into the cache and not display the second file until the hyperlink is activated by a user.

6. The non-transitory computer readable medium of claim 5 wherein the fast loading files includes text content, a website logo and navigation images.

7. The non-transitory computer readable medium of claim 6 wherein the slow loading files include files containing graphics content and audio content.

8. The non-transitory computer readable medium of claim 5 wherein said instructions to load and immediately display the fast loading files comprise instructions to load and display a collection of content items having a file size not to exceed 105 KB.

9. A user computer system comprising at least one subsystem that includes a non-transitory computer readable medium having computer executable instructions that when executed cause the subsystem to:
- access a web site;
- receive a web document having a content item having a first plurality of files and a hyperlink to a second file;
- determine for each of the first plurality of files whether it is a fast loading file or a slow loading file based on the size of the file or the type of file from the file name extension;
- load and immediately display the fast loading files;
- load the slow loading files into a cache and only display the slow loading files when they have been fully loaded into the cache;
- load the second file into the cache and not display the second file until the hyperlink is activated by a user.

10. The computer system of claim 9 wherein the fast loading files includes text content, a website logo and navigation images.

11. The computer system of claim 10 wherein the slow loading files include files containing graphics content and audio content.

12. The computer system of claim 9 wherein said subsystem that loads the fast loading files comprises at least one subsystem that loads and displays a collection of content items having a total file size not to exceed 105 KB.

* * * * *